(12) United States Patent
Manchester (10) Patent No.: US 6,371,283 B1
(45) Date of Patent: Apr. 16, 2002

(54) MODULAR SANITARY CONVEYOR (76) Inventor: Doug Manchester, 1614 Isom, Houston, TX (US) 77039

( * ) Notice: Subject to any disclaimer, the term of this patent is extended or adjusted under 35 U.S.C. 154(b) by 0 days.

(21) Appl. No.: 09/494,264

(22) Filed: Jan. 28, 2000

Related U.S. Application Data (60) Provisional application No. 60/117,668, filed on Jan. 28, 1999.

(51) Int. Cl.$^7$ .............................................. B65G 23/44
(52) U.S. Cl. ....................................... 198/816; 198/813
(58) Field of Search ................................ 198/813, 816, 198/860.3

(56) References Cited

U.S. PATENT DOCUMENTS

| | | | | |
|---|---|---|---|---|
| 1,785,141 A | * | 12/1930 | Morton | 198/816 |
| 2,541,080 A | * | 2/1951 | Lyon | 198/816 |
| 3,118,315 A | * | 1/1964 | Loosli | 198/816 |
| 3,718,197 A | * | 2/1973 | Barten et al. | 198/816 |
| 3,751,122 A | * | 8/1973 | Dubay | 198/816 |
| 4,803,804 A | * | 2/1989 | Bryant | 198/113 |
| 5,174,435 A | * | 12/1992 | Dorner et al. | 198/816 |
| 6,161,683 A | * | 12/2000 | Wallis | 198/816 |
| 6,209,715 B1 | * | 4/2001 | Eltvedt | 198/816 |

* cited by examiner

Primary Examiner—Christopher P. Ellis
Assistant Examiner—Khoi H. Tran
(74) Attorney, Agent, or Firm—Kenneth A. Roddy (57) ABSTRACT

A modular sanitary conveyor has a longitudinal conveyor bed unit slidably received and supported on a support stand and a drive motor unit slidably received and supported on the side of the bed unit. The bed unit has longitudinal side panels on laterally opposed sides with longitudinal slots extending inwardly from the forward and tail ends. A drive roller is removably and rotatably mounted in removable unitary drive roller bearings mounted in or adjacent to the slots at the forward end of the side panels and an end roller is removably mounted in unitary end roller bearings slidably mounted in or adjacent to the slots at their tail end. One or more idler rollers are removably and rotatably supported at each end between the side panels. A manually operable belt tensioning and release mechanism removably mounted on the inner side of the side panels is releasably connected with each end roller bearing to slidably move the end roller bearings and end roller away from the drive roller to apply tension to an endless belt entrained around the rollers, and toward the drive roller to release belt tension and allow the belt to be cleaned or removed laterally from the bed unit.

12 Claims, 6 Drawing Sheets

MODULAR SANITARY CONVEYOR

CROSS REFERENCE TO RELATED APPLICATION

This application claims priority of U.S. Provisional Patent Application Ser. No. 60/117,668 filed Jan. 28, 1999.

BACKGROUND OF THE INVENTION

1. Field of the Invention

This invention relates generally to conveyors, and more particularly to a modular sanitary conveyor especially adapted for use in applications in which strict sanitary standards must be met, such as the food industry.

2. Brief Description of the Prior Art

Conveyors are typically used for the transport of many articles including produce and food products between various processing stations. In many food processing industries, the food processing plant is laid out in a particular manner and the requisite conveyors are installed to meet the particular layout requirements. If any change in the plant layout or disposition of the processing stations is required, the old conveyors are discarded or reconstructed or a new custom set of conveyors must be built and installed at a substantial cost.

Sanitation is a primary consideration in the food processing industry, and the conveyors must be maintained in a clean and hygienic condition to meet basic sanitary standards. Cleaning of the conveyors requires considerable down-time of the equipment.

When conventional conveyors with endless belts are used, it is usually very time-consuming to clean the conveyors because the inside of the belt, the end rollers and all other conveyor parts covered by the belt are very difficult or impossible to clean in an acceptable way. In some instances the conveyors have ledges, pockets and various surfaces which accumulate debris from the food being processed, and some portions of the conveyors may be difficult to access.

There are several patents that disclose various modular conveyors and belt tensioning apparatus.

Fleckenstein et al, U.S. Pat. No. 3,993,185 discloses a sanitary conveyor for use in strict sanitary environments that has a quick belt release whereby the belt and the conveyor may be cleaned without removing the belt from the conveyor. The shaft of the drive roller is fixed in slots at the forward end of the conveyor bed and the shaft of the idler roller at the tail end extends through slots at the tail end and its outer ends are fixed in collars. The rollers rotate on the fixed shafts. Belt tensioning and slack off toggle clamp mechanisms disposed on the exterior of each side contact the collars to apply pressure to the collars and thus the roller shaft and apply tension to the belt or are retracted from contact with the collars to relax tension to enable the conveyor, and both sides of the belt to be cleaned without disassembly or removal of the belt from the conveyor.

Mattos, U.S. Pat. No. 4,007,827 discloses a modular conveyor particularly adapted for food processing installations including a plurality of pedestals arranged along a single line and removably connected to a plurality of aligned beams and laterally-spaced side rails to support a plurality of belt-supporting rollers. The conveyor can be adjusted to a cleaning position where the conveyor belt is opened for interior cleaning while still permitting the belt to be driven by its usual driving mechanism.

Bryant, U.S. Pat. No. 4,803,804 discloses a telescopic belt tensioner that includes a pair of housings mounted to the sides of a conveyor bed. Each housing has an outer tube telescopically mounted in it, and an inner tube telescopically received within the outer tube. The inner tube includes means for rotatably supporting a conveyor belt roller. Bolt and nut means between the inner and outer tubes reciprocate the inner tube with respect to the outer tube to provide fine adjustment of the belt tension. A quick release mechanism between the housing and outer tube provides rapid adjustment of belt tension. The quick release mechanism comprises a lever mounted to the housing and a hook mounted to the outer tube, with a pivotable link connecting the lever and hook.

Dorner et al, U.S. Pat. No. 5,174,435 discloses a conveyor construction including a frame having a pair of side rails with each side rail having a longitudinal T-shaped slot. A plurality of cross members are connected between the side rails and support a bed plate. An endless belt rides on the bed plate and is trained over an adjustable spindle assembly which is located at an end of the conveyor. The spindle assembly includes a spindle journalled between a pair of side members that are mounted for sliding movement in the T-slots of the respective side rails. A ratchet and pinion mechanism interconnects the conveyor frame with the spindle assembly and acts to move the spindle assembly longitudinally of the frame to tension the belt. A belt tracking mechanism is associated with each side of the spindle assembly and includes a cam member which is engaged with the respective side member of the spindle assembly. Individual rotation of the cam members serve to properly track the belt on the bed plate. To attach components to the conveyor frame, spring loaded nuts are slidably mounted in the T-slots of the side rails and the components are attached to the spring loaded nuts.

The present invention is distinguished over the prior art in general and these patents in particular by a modular sanitary conveyor having a longitudinal conveyor bed unit slidably received and supported on a support stand and a drive motor unit slidably received and supported on the side of the bed unit. The bed unit has longitudinal side panels on laterally opposed sides with longitudinal slots extending inwardly from the forward and tail ends. A drive roller is removably and rotatably mounted in removable unitary drive roller bearings mounted in or adjacent to the slots at the forward end of the side panels and an end roller is removably mounted in unitary end roller bearings slidably mounted in or adjacent to the slots at their tail end. One or more idler rollers are removably and rotatably supported at each end between the side panels. A manually operable belt tensioning and release mechanism removably mounted on the inner side of the side panels is releasably connected with each end roller bearing to slidably move the end roller bearings and end roller away from the drive roller to apply tension to an endless belt entrained around the rollers, and toward the drive roller to release belt tension and allow the belt to be cleaned or removed laterally from the bed unit.

SUMMARY OF THE INVENTION

It is therefore an object of the present invention to provide a modular sanitary conveyor that is particularly useful in applications in which strict sanitary standards must be met, such as the food industry, and all of the components can be steam cleaned.

It is another object of this invention to provide a modular sanitary conveyor having a unitized conveyor bed unit that easily and quickly slides laterally onto and off of, and is supported on a mobile support stand in horizontal or inclined disposition.

Another object of this invention is to provide a modular sanitary conveyor having a drive motor unit that easily and quickly slides laterally onto and off of, and is securely supported on either side of a unitized conveyor bed unit.

Another object of this invention is to provide a modular sanitary conveyor having a drive roller and an end roller removably and rotatably supported in unitary bearing members which are formed of low friction material that is approved by the FDA for food grade service.

Another object of this invention is to provide a modular sanitary conveyor having unitary roller supporting bearing members formed of low friction material that are slidably mounted at each end of the conveyor bed unit and are easily and quickly installed and removed from the conveyor bed unit.

Another object of this invention is to provide a provide a modular sanitary conveyor having a manually operable belt tensioning and release mechanism removably mounted on the inner sides of the conveyor bed unit that moves the end roller away from the drive roller to apply tension to an endless belt entrained around the rollers, and toward the drive roller to release belt tension and allow the belt to be removed laterally from the bed unit.

A further object of this invention is to provide a modular sanitary conveyor that requires no screws, bolts, nuts, or washers and wherein all of the components may be easily and quickly manually disconnected and dismantled for cleaning, in a matter of minutes, without requiring special tools.

A still further object of this invention is to provide a modular sanitary conveyor that is simple in construction, inexpensive to manufacture, and ir rugged and reliable in operation.

Other objects of the invention will become apparent from time to time throughout the specification and claims as hereinafter related.

The above noted objects and other objects of the invention are accomplished by a modular sanitary conveyor having a longitudinal conveyor bed unit slidably received and supported on a support stand and a drive motor unit slidably received and supported on the side of the bed unit. The bed unit has longitudinal side panels on laterally opposed sides with longitudinal slots extending inwardly from the forward and tail ends. A drive roller is removably and rotatably mounted in removable unitary drive roller bearings mounted in or adjacent to the slots at the forward end of the side panels and an end roller is removably mounted in unitary end roller bearings slidably mounted in or adjacent to the slots at their tail end. One or more idler rollers are removably and rotatably supported at each end between the side panels. A manually operable belt tensioning and release mechanism removably mounted on the inner side of the side panels is releasably connected with each end roller bearing to slidably move the end roller bearings and end roller away from the drive roller to apply tension to an endless belt entrained around the rollers, and toward the drive roller to release belt tension and allow the belt to be cleaned or removed laterally from the bed unit.

DESCRIPTION OF THE PREFERRED EMBODIMENT

Figure 1:
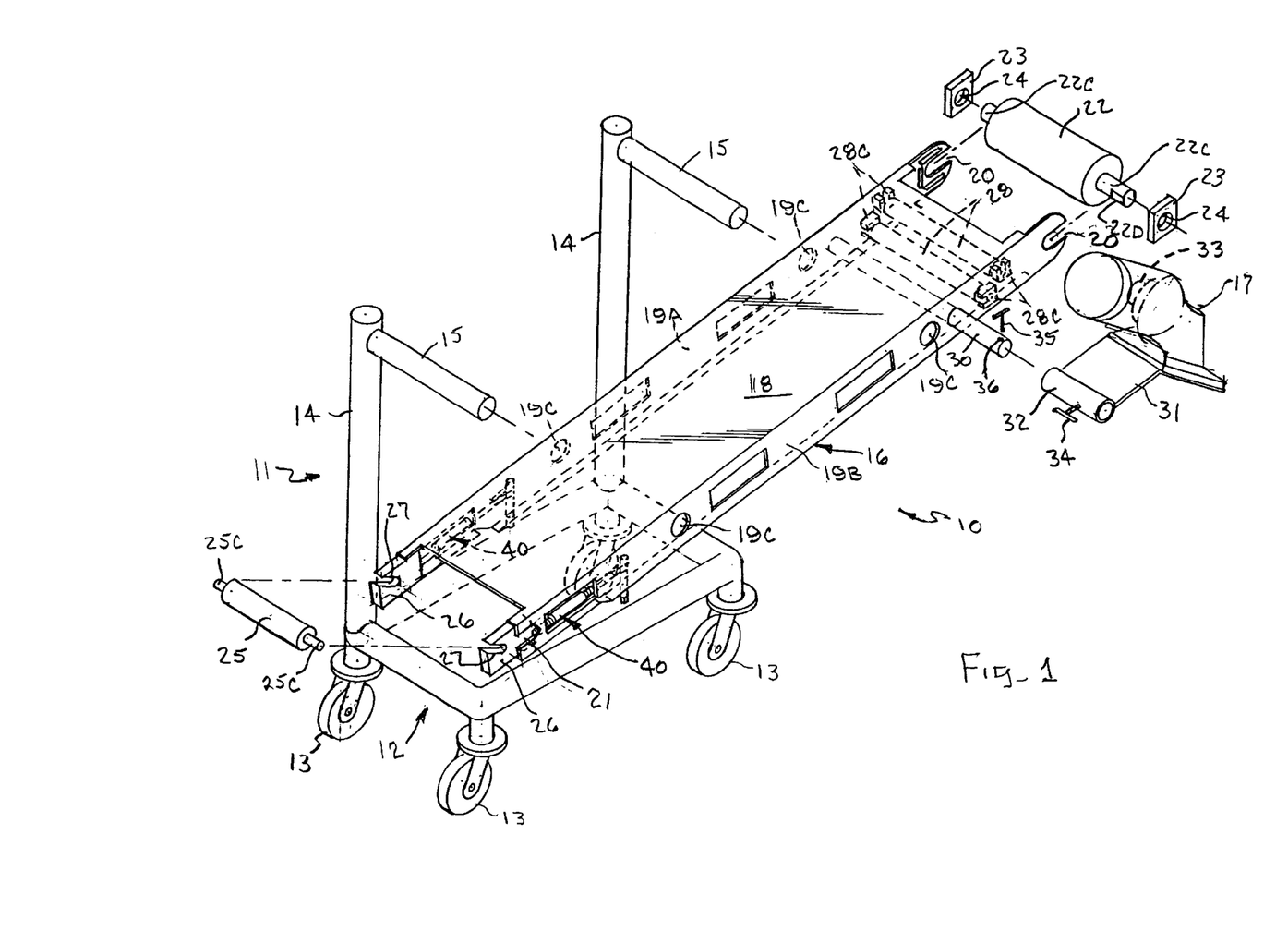
FIG. 1 is an exploded isometric view of a modular sanitary conveyor in accordance with the present invention without the belt, showing how the conveyor is assembled by sliding the conveyor bed unit onto the arms of a support stand, and slidably installing the drive motor assembly onto the conveyor bed unit.
Figure 2:
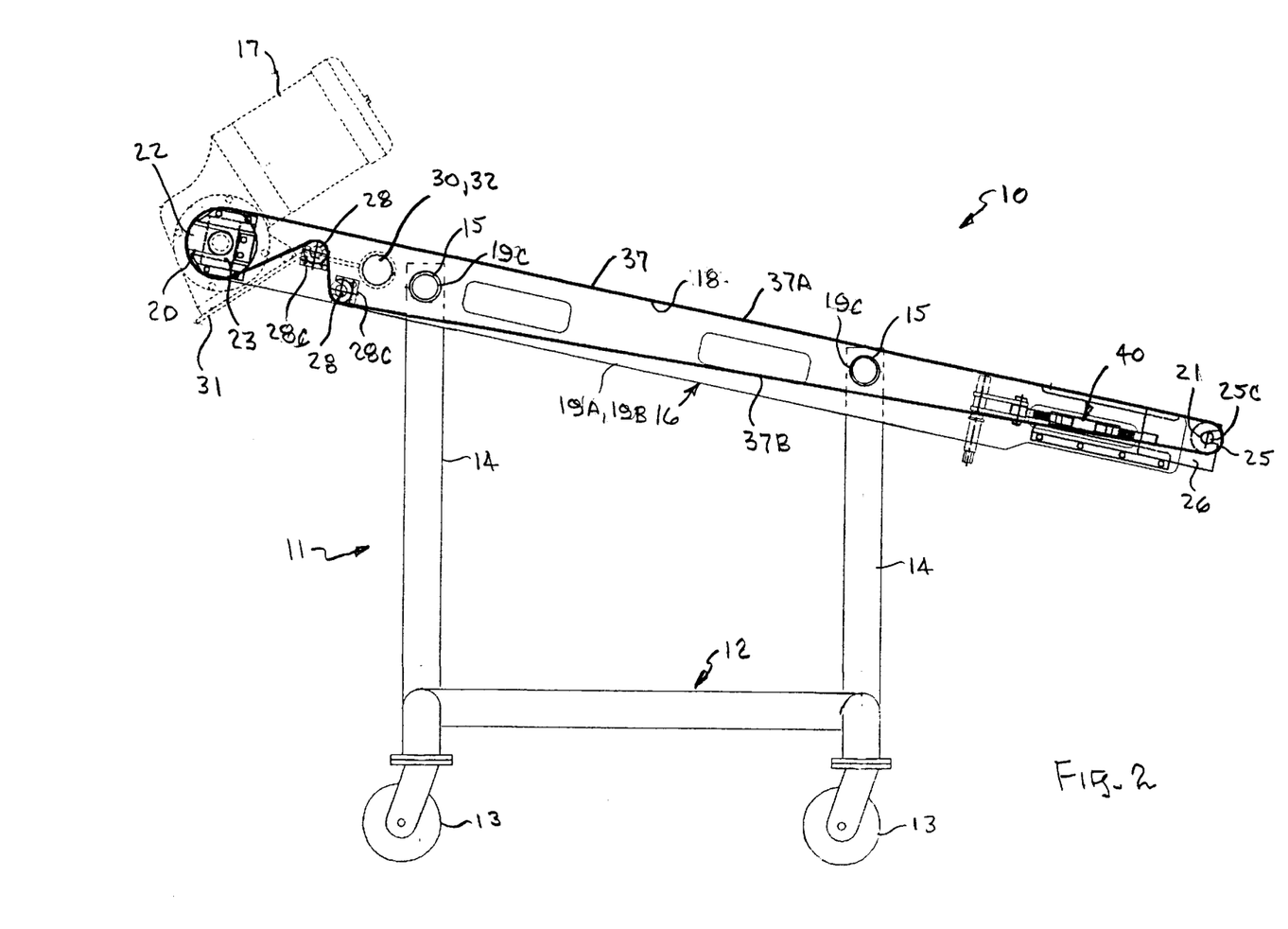
FIG. 2 is a side elevation of the modular sanitary conveyor of FIG. 1 shown somewhat schematically in the assembled condition including the belt and supported on the arms of the support stand.
Figure 3:
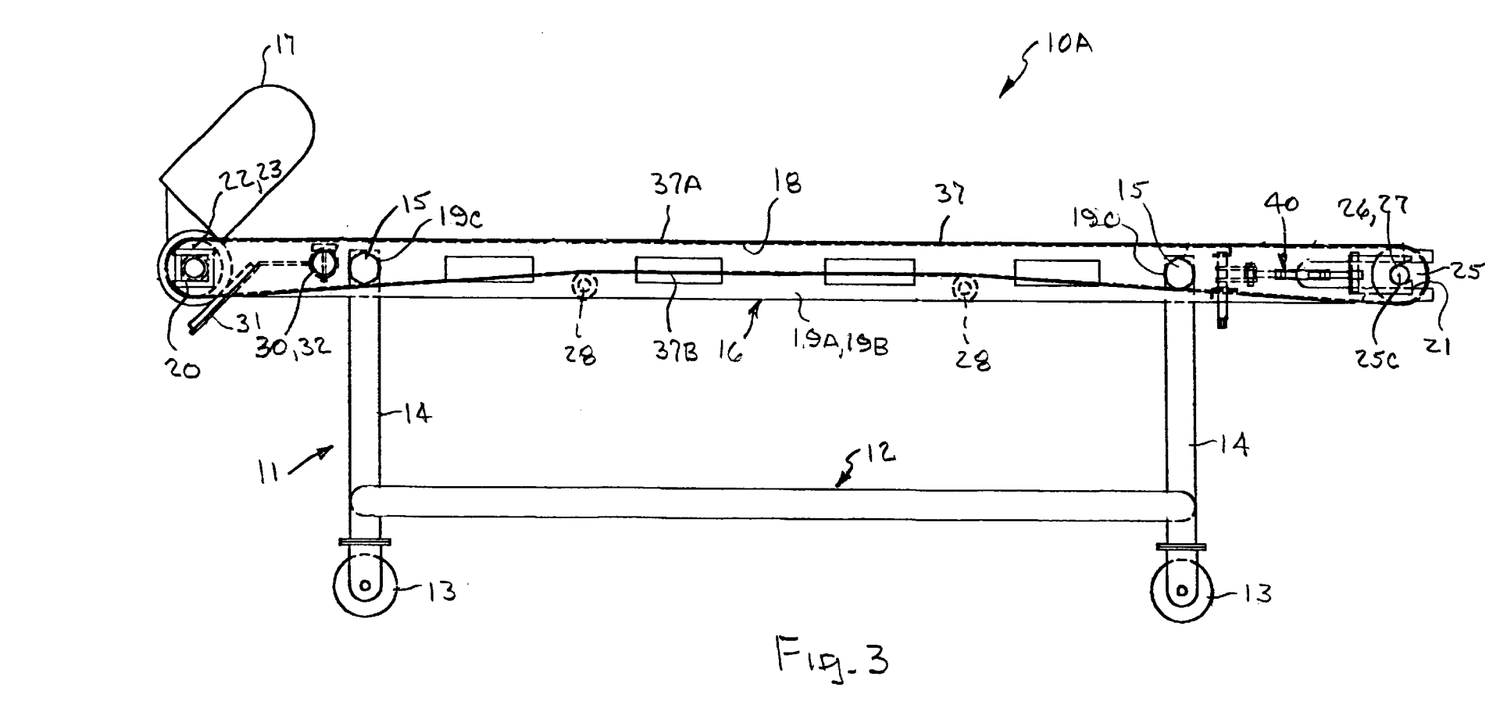
FIG. 3 is a side elevation of a second embodiment of the modular sanitary conveyor having a modified end roller and idler roller arrangement, shown somewhat schematically, in the assembled condition and supported horizontally on the arms of the support stand.

Referring to the drawings by numerals of reference, there is shown in FIGS. 1, and 2, a preferred modular sanitary conveyor assembly 10 in accordance with the present invention supported on a support stand 11. FIG. 3 shows somewhat schematically a second preferred embodiment of the conveyor assembly 10A. The same numerals of reference are used to designate the same components.

The support stand 11 is of tubular construction. The stand 11 has a rectilinear base 12 formed of tubular members supported on wheels 13 attached near the four corners thereof. A pair of tubular vertical support arms 14 are secured at their bottom ends to one side of the base 12 and each has a tubular horizontal arm 15 secured near their top end that extend a distance over the base 12. The vertical support arms 14 may be of unequal height to place the conveyor assembly 10 at an angle relative to horizontal, or may be of equal height to place it horizontally, as shown in FIG. 3, depending upon the particular installation requirements. It should be understood that the vertical legs 14 may also be of telescopically adjustable construction.

FIG. 1 shows how the conveyor bed unit is mounted and removed from the support stand 11. As described in detail hereinafter, the conveyor assembly 10, 10A includes a longitudinal conveyor bed unit 16 that slides laterally on and off of, and is supported on the horizontal arms 15 of the support stand 11. A drive motor assembly 17 slides laterally onto, and is secured to the conveyor bed unit 16.

The conveyor bed unit 16 includes a flat bed portion 18 which is preferably planar from edge to edge and left and right side panels 19A and 19B, respectively, that extend downwardly from the bed portion 18. A pair of longitudinally spaced apart holes 19C are formed in each side panel 19A, 19B in laterally opposed axially aligned relation to slidably receive the horizontal arms 15 of the support stand 11. The side panels 19A, 19B each have a first longitudinal slot 20 extending inwardly from their forward end in laterally opposed relation and a second slot 21 extending inwardly a distance from their tail end in laterally opposed relation;

A drive roller 22 is removably and rotatably supported at each end in a pair of generally rectangular drive roller support bearing members 23 that are slidably received and removably mounted on brackets 24 secured on laterally opposed inner surfaces of the side panels 19A, 19B adjacent to the slots 20. Each drive roller support bearing 23 has a central hole 24 axially aligned with the inwardly extending slots 20 at the forward end or discharge end of the conveyor bed unit 16.

An end roller 25 is removably and rotatably supported at each end in a pair of generally rectangular end roller support bearing members 26 that are slidably mounted on guide rails (described hereinafter) at the tail or receiving end of the conveyor bed unit 16. Each end roller support bearing 26 has a slot 27 in its outer end that receives the shaft at each end of the end roller.

The drive roller support bearings 23 and end roller support bearings 26 are non-lubricated and of unitary solid construction, and preferably are made of low-friction plastic or composite material that is approved by the FDA for food grade service. All of the components of the present invention can be steam cleaned.

A pair of idler rollers 28 are removably and rotatably supported in first and second pairs of generally U-shaped idler roller support brackets 28C that are secured to the laterally opposed inner surfaces of the side panels 19A, 19B. In FIGS. 1 and 2, the idler rollers 28 are shown located near the drive roller 22. In FIG. 3, the idler rollers 28 are shown located approximately midway between the drive roller 22 and end roller 25.

Figure 4:
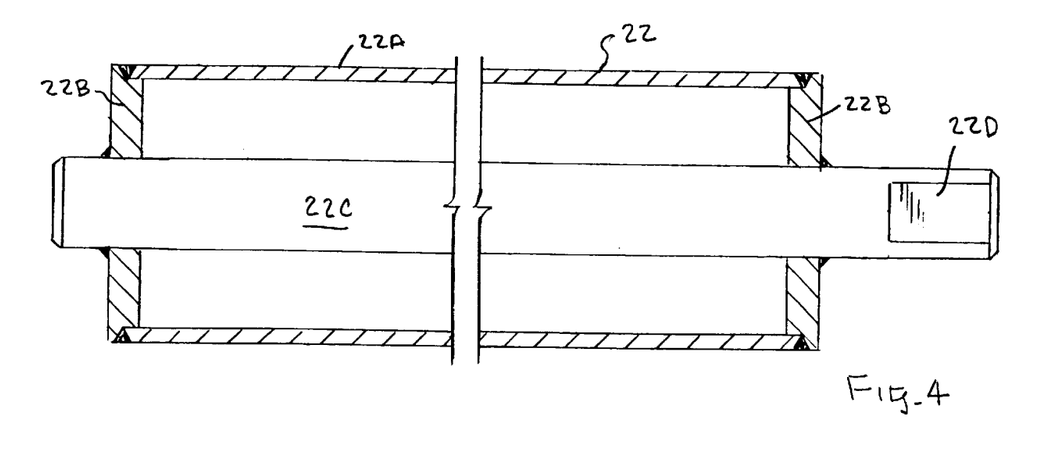
FIG. 4 is a longitudinal cross section view of the drive roller of the modular conveyor.
Figure 5:
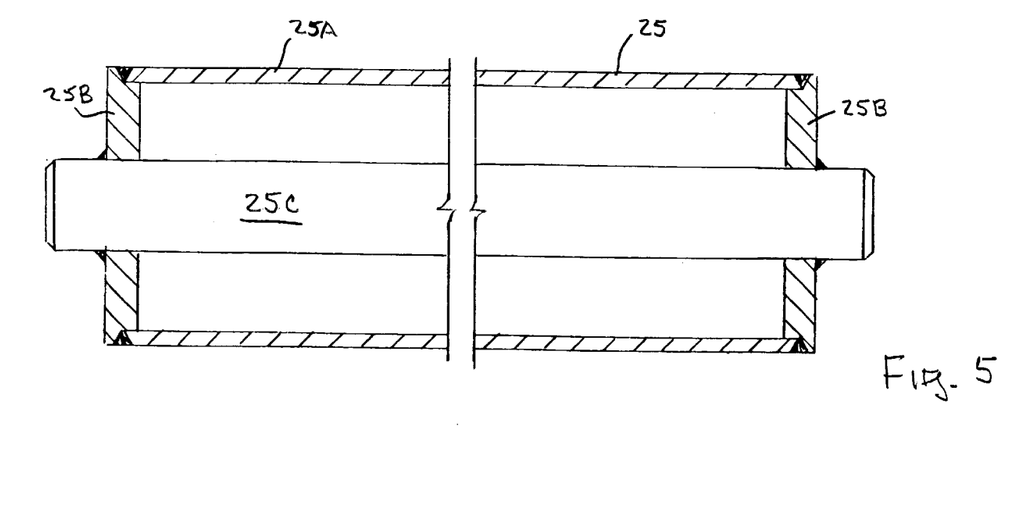
FIG. 5 is a longitudinal cross section view of the end roller.

As shown in cross section in FIGS. 4 and 5, the drive roller 22 and the end roller 25 are each formed of a hollow cylindrical drum 22A and 25A, respectively, having end plates 22B, 25B welded into its opposed ends, and a central shaft 22C, 25C extending through the center of the drum and end plates. The shafts 22C, 25C are welded to the end plates 22B, 25B and the end plates are and welded to the drums 22A, 25A to provide a sealed welded construction with no openings to eliminate bacteria gathering crevices. The drive roller 22 and the end roller 25 do not rotate relative their shafts. One end of the drive roller shaft 22C is provided with flats 22D at its outer end.

Figure 6:
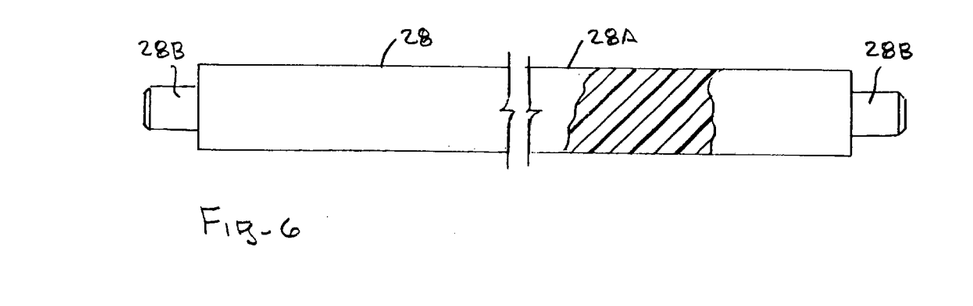
FIG. 6 is a side elevation of a preferred idler roller of the modular conveyor.

As shown in FIG. 6, the preferred idler rollers 28 are of unitary solid construction having a larger drum portion 28A and reduced diameter shaft portions 28B at opposed ends. The idler rollers 28 are preferably are made of low-friction plastic or composite material that is approved by the FDA for food grade service.

Referring again to FIGS. 1, 2 and 3, the ends of the shaft 22C the drive roller 22 extend through the holes 24 in the rectangular bearing members 23 and outwardly through the slots 20 in the forward end of each side panel 19A, 19B. The end of the shaft 22C having flats extends laterally outward a short distance from one of the side panels 19B. The shafts 28A at the ends of the idler rollers 28 are slidably received and rotatably supported in the U-shaped support brackets 28C. The shafts 25C at the ends of the end roller 25 are slidably received and rotatably supported in the U-shaped slots 27 at the outer ends of the end roller support bearings 26 that are slidably mounted at the tail end of the conveyor bed unit 16.

Figure 7:
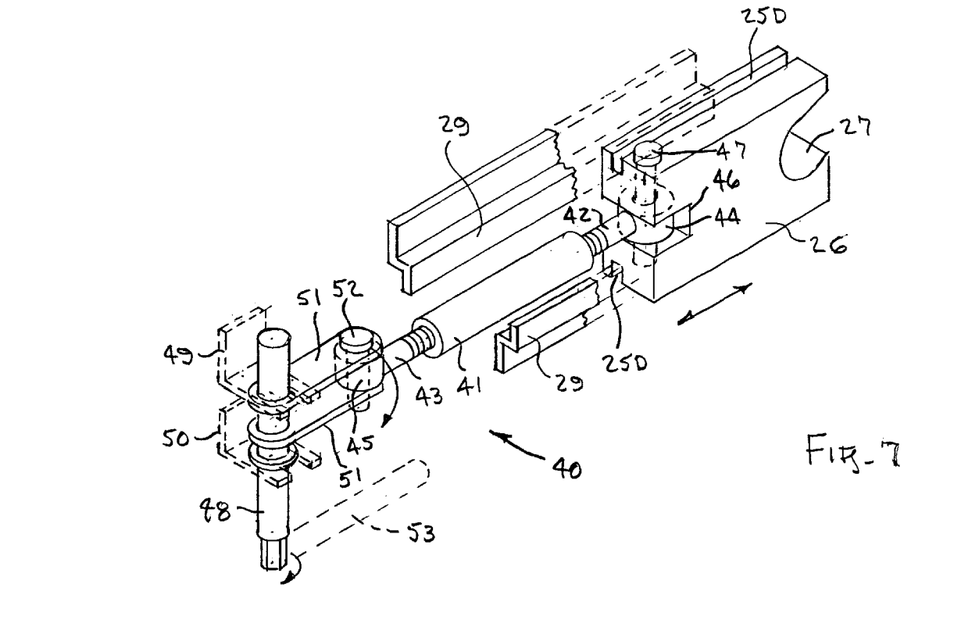
FIG. 7 is an isometric view of the belt tensioning and release toggle assembly with an end roller bearing member connected thereto.

As shown in FIG. 7, each end roller support bearing 26 is provided with a longitudinal slot 26D in its top and bottom surfaces that are slidably received and removably received on guide rails 29 secured on laterally opposed inner surfaces of the side panels 19A, 19B adjacent to the slots 21. Alternatively, as shown in FIG. 8, each end roller support bearing 26 may be provided with a longitudinal slot 26D in its top and bottom surfaces that are slidably received and removably received on the vertically opposed surfaces of the slots 21 at the tail end of the side panels 19A, 19B rather than utilizing guide rails.

Figures 8, 9:
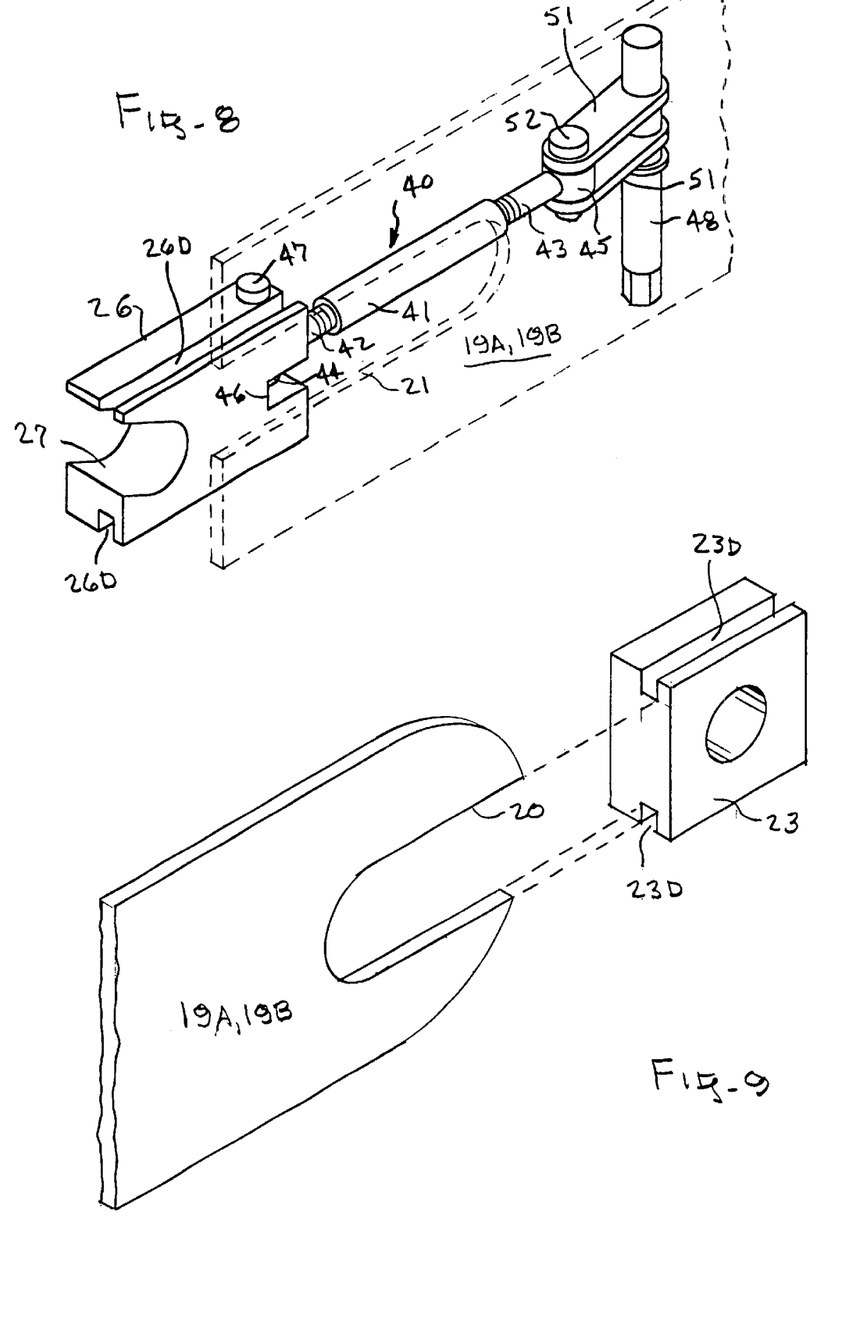
FIG. 8 is an isometric view of an alternate end roller bearing member.
FIG. 9 is an isometric view of an alternate drive roller bearing member.

As shown in FIG. 9, each drive roller support bearing 23 may alternatively be provided with a longitudinal slot 23D in its top and bottom surfaces that are slidably received and removably received on the vertically opposed surfaces of the slots 20 at the forward end of the side panels 19A, 19B rather than utilizing brackets.

Referring again to FIGS. 1, 2 and 3, a mounting rod 30 is secured transversely between the side panels 19A, 19B and has one extending outwardly a distance from the side panel 19B with its axis parallel to the drive roller axis. The drive motor 17 is mounted on a motor mount plate 31. The motor mount plate 31 has a hollow tube 32 secured across one end. The drive shaft of the motor 17 has a tubular connector or arbor 33 extending outwardly therefrom with internal flats that receive the flats 22D on the outer end of the drive roller shaft 22C. It should be understood that the motor may also be provided with a clutch mechanism.

As best seen in FIG. 1, the motor mount plate 31 with the motor mounted thereon is assembled onto the conveyor bed unit 16 by sliding the tube 32 of the motor mount plate 31 onto the outwardly extending mounting rod 30 and sliding the tubular arbor 33 extending from the motor shaft onto the shaft 22C of the drive roller 22.

A T-shaped threaded lock pin 34 extends through the side wall of the tube 32 and engages the mounting rod 30 to secure the motor mount plate 31 on the mounting rod 30 at the correct lateral spacing. A second T-shaped pin 35 extends through a transverse hole 36 near the outer end of the mounting rod 30 to prevent the motor assembly from sliding off of the mounting rod in the event that the lock pin becomes accidentally loosened.

A shown somewhat schematically in FIGS. 2 and 3, the conveyor belt 37 includes a conveying run 37A and a return run 37B. The endless belt 37 passes around the drive roller 22, which is driven by the motor, at the forward end of the conveyor bed unit 16 and the end roller 25 at its tail or receiving end. The return run 37A of the belt 37 passes over the first and second idler rollers 28 disposed beneath the bed portion 18 of the bed unit.

Referring now additionally to FIGS. 7 and 8, a pair of belt tensioning and release toggle assemblies 40 are mounted on the opposed side panels 19A, 198 of the conveyor bed unit 16 and each is releasably connected to the inward facing end of a respective end roller support bearing member 26. As described above, the bearing members 26 are slidably received and supported on vertically spaced rails 29 on each side panel 19A, 19B (FIG. 7), or as shown in FIG. 8, on the vertically opposed surfaces of the slot 21 to allow the bearing members to slid axially relative to the conveyor bed unit.

Each belt tensioning and release toggle assembly 40 includes a turnbuckle 41 which is visible and accessible through an opening in the side panels 19A, 19B. Threaded rods 42 and 43 are threadedly engaged in the opposed ends of the turnbuckle 41. The outer ends of the rods 42 and 43 are provided with horizontal flat circular elements 44 and 45, respectively. The circular element 44 is received in a slot 46 in the inward end of the bearing member 26 and pivotally connected thereto by a vertical pivot pin 47.

A release rod 48 is removably received and rotatably supported vertically in brackets 49 and 50 secured to each side panel 19A, 19B. A pair of vertically spaced link members 51 are secured at one end to the rod 48 to rotate therewith. The circular element 45 of the rod 43 is pivotally connected to the outer ends of the link members 51 by a vertical pivot pin 52. The bottom end of the release rod 48 is polygonal to receive a common hand wrench for rotating the rod. Alternatively, as shown in dashed line in FIG. 7, the bottom end of the rod 48 may be provided with a lever 53 for rotating the rod.

Tension on the belt 37 is accomplished by turning the turnbuckle 41 to move the end roller support bearing members 25 and end roller 25 inwardly or outwardly relative to the conveyor bed unit 16 and drive roller 22. Releasing and removal of the belt 37 is accomplished by rotation of the release rod 48. As indicated by arrows in FIG. 7, rotation of the rod 48 about its vertical axis pivots the link members 51 and one end of the turnbuckle 41 outwardly which pulls the end roller support bearing members 26 inwardly relative to the conveyor bed unit 16 and drive roller 22.

Retracting the end roller bearing members 26 allows the overall length between the drive roller 22 and end roller 25 to be shortened, which in turn allows sufficient slack on the conveyor belt 37 so that it can be easily cleaned in place, or can easily be removed laterally from the conveyor bed unit 16. Depending upon the diameter of the end roller and amount of slack in the belt, it may be necessary to first remove the end roller and then remove the belt laterally from the bed unit.

All of the components may be easily and quickly disconnected for cleaning. The conveyor bed unit slides laterally off of the support arms of the stand. The motor assembly slides off of the conveyor bed unit, and requires no screws, bolts, nuts, or washers. All the rollers are easily lifted out with no tools required. The belt and rollers can be cleaned separately, and the belt tensioning and release mechanism lifts out for separate cleaning. A six-foot long conveyor can be completely dismantled for cleaning in less than five minutes by one person using only a common wrench.

While this invention has been described fully and completely with special emphasis upon a preferred embodiment, it should be understood that within the scope of the appended claims the invention may be practiced otherwise than as specifically described herein.

What is claimed is:

1. A modular sanitary conveyor, comprising:

a longitudinal conveyor bed unit having longitudinal side panels on laterally opposed sides extending from a forward end to a tail end, said side panels having a first pair of longitudinal slots extending inwardly from said forward end in laterally opposed relation and a second pair of slots extending inwardly a distance from said tail end in laterally opposed relation;

a pair of unitary drive roller support bearing members removably mounted on said side panels at said forward end in laterally opposed relation and each having a transverse aperture therethrough;

a pair of unitary end roller bearing members slidably and removably mounted on said side panels at said tail end in laterally opposed relation and each having an aperture at an outer end;

a drive roller having shafts extending from opposed ends in axial alignment, said drive roller shafts slidably received and rotatably supported in respective said drive roller support bearing apertures, and one of said shafts extending laterally outward a distance from one of said side panels;

an end roller having shafts extending from opposed ends in axial alignment, said end roller shafts sidably received and rotatably supported in respective said end roller support bearing apertures;

an endless loop conveyor belt entrained around said drive roller and said end roller; and manually operable belt tensioning and release means mounted on each of said longitudinal side panels operatively connected with each of said end roller bearing members for slidably moving said end roller bearing members and said end roller away from said drive roller whereby tension is applied to said conveyor belt, and toward said drive roller whereby tension in said conveyor belt is released and said belt is slackened sufficient to allow said belt to be cleaned or removed laterally from said conveyor bed unit.

2. The modular sanitary conveyor according to claim 1, further comprising:

a support stand having a pair of spaced apart horizontal arms at an upper end thereof; and a pair of longitudinally spaced apart apertures through each of said side panels disposed in laterally opposed axially aligned relation to slidably receive said spaced apart horizontal arms of said support stand for removably supporting said conveyor bed unit thereon.

3. The modular sanitary conveyor according to claim 2, wherein said support stand has a rectilinear base supported on wheels, a pair of spaced apart vertical support arms extending upwardly therefrom, and said horizontal arms extend outwardly from said vertical support arms.

4. The modular sanitary conveyor according to claim 1, further comprising:

a motor support bar extending laterally outward a distance from one of said side panels;

a drive motor unit including a drive motor secured to a support plate slidably received and supported on said motor support bar; and shaft connector means connected with a drive shaft of said drive motor and having an outer end received on said drive roller laterally outward extending shaft to impart rotary motion thereto.

5. The modular sanitary conveyor according to claim 1, wherein said shafts of said drive roller are fixed at opposed ends thereof to rotate therewith as a single unit, and said shafts of said end roller are fixed at opposed ends to rotate therewith as a single unit.

6. The modular sanitary conveyor according to claim 1, further comprising:

at least one idler roller of unitary construction having shafts extending from opposed ends in axial alignment removably received and rotatably supported transversely between laterally opposed inner surfaces of said side panels and disposed between said drive roller and said end roller in parallel relation therewith, and over which said conveyor belt passes.

7. The modular sanitary conveyor according to claim 1, wherein each said manually operable belt tensioning and release means is removably mounted on an inner surface said side panels.

8. The modular sanitary conveyor according to claim 1, wherein each of said unitary end roller bearing members is a generally rectangular member and said aperture in each of said end roller bearing members is a slot extending inwardly from said outer end;

said shafts of said end roller are slidably received and rotatably supported in said slots; and said end roller is installed by manually sliding said shafts into said slots and removed by manually withdrawing said shafts therefrom when said belt is removed from said conveyor bed unit.

9. The modular sanitary conveyor according to claim 8, wherein each of said generally rectangular end roller bearing members has a slot extending along upper and lower ends slidably received on guide rails adjacent to said slots at said tail end of said side panels.

10. The modular sanitary conveyor according to claim 8, wherein each of said generally rectangular end roller bearing members has a slot extending along upper and lower ends slidably received on vertically opposed surfaces of said slots at said tail end of said side panels.

11. The modular sanitary conveyor according to claim 1, wherein each of said unitary drive roller bearing members is a generally rectangular member having a slot extending along upper and lower ends slidably received on guide rails adjacent to said slots at said forward end of said side panels.

12. The modular sanitary conveyor according to claim 1, wherein each of said each of said unitary drive roller bearing members is a generally rectangular member having a slot extending along upper and lower ends slidably received on vertically opposed surfaces of said slots at said forward end of said side panels.

\* \* \* \* \*